US012802919B2

(12) United States Patent
Wakley et al.

(10) Patent No.: US 12,802,919 B2
(45) Date of Patent: Nov. 17, 2026

(54) X-RAY WINDOW WITH ATOMIC LAYER DEPOSITION

(71) Applicant: Moxtek, Inc., Orem, UT (US)

(72) Inventors: Brayden Wakley, Provo, UT (US); Jared Sommer, Bountiful, UT (US)

(73) Assignee: Moxtek, Inc., Orem, UT (US)

( * ) Notice: Subject to any disclaimer, the term of this patent is extended or adjusted under 35 U.S.C. 154(b) by 85 days.

(21) Appl. No.: 19/045,889

(22) Filed: Feb. 5, 2025

(65) Prior Publication Data

US 2025/0285826 A1 Sep. 11, 2025

Related U.S. Application Data

(60) Provisional application No. 63/561,618, filed on Mar. 5, 2024.

(51) Int. Cl.
*H01J 35/18* (2006.01)

(52) U.S. Cl.
CPC ......... *H01J 35/18* (2013.01); *H01J 2235/183* (2013.01)

(58) Field of Classification Search
CPC ............................ H01J 35/18; H01J 2235/183
See application file for complete search history.

(56) References Cited

U.S. PATENT DOCUMENTS 5,161,179 A * 11/1992 Suzuki ...................... G21K 1/10 378/140
5,226,067 A * 7/1993 Allred ...................... G21K 1/10 378/140
9,305,735 B2 * 4/2016 Liddiard ................. H01J 35/18
10,760,158 B2 * 9/2020 Shanbhag ............. C23C 16/325

FOREIGN PATENT DOCUMENTS

WO WO-2013138258 A1 * 9/2013 ............... G21K 1/00

OTHER PUBLICATIONS

Liddiard et al, "Improved Low Energy X-ray Transmission Window" Microscopy Society of America 2013, pp. 1316-1317. (Year: 2013).*

* cited by examiner

*Primary Examiner* — Uzma Alam
*Assistant Examiner* — Fani Polyzos Boosalis
(74) *Attorney, Agent, or Firm* — Thorpe North & Western, LLP

(57) ABSTRACT

A mounted x-ray window has an x-ray window mounted on a flange of a housing and spanning and covering an aperture. The x-ray window includes one or more layers each having a low atomic number less than 14. An additive passivation film is associated with the x-ray window and has a thickness greater than 5 nanometers (nm) and less than a thickness of each of the one or more layers. The additive passivation film can be deposited by atomic layer deposition.

20 Claims, 4 Drawing Sheets

X-RAY WINDOW WITH ATOMIC LAYER DEPOSITION

PRIORITY CLAIM

Priority is claimed to U.S. Provisional Patent Application No. 63/561,618, filed Mar. 5, 2024, which is hereby incorporated herein by reference.

FIELD OF THE INVENTION

The present application is related to x-ray windows with an added passivation film.

BACKGROUND

X-ray windows are designed to transmit a high percentage of x-rays, even low energy x-rays. X-ray windows are used in expensive systems requiring high reliability. High system requirements result in demanding characteristics of the x-ray window.

Figure 1A:
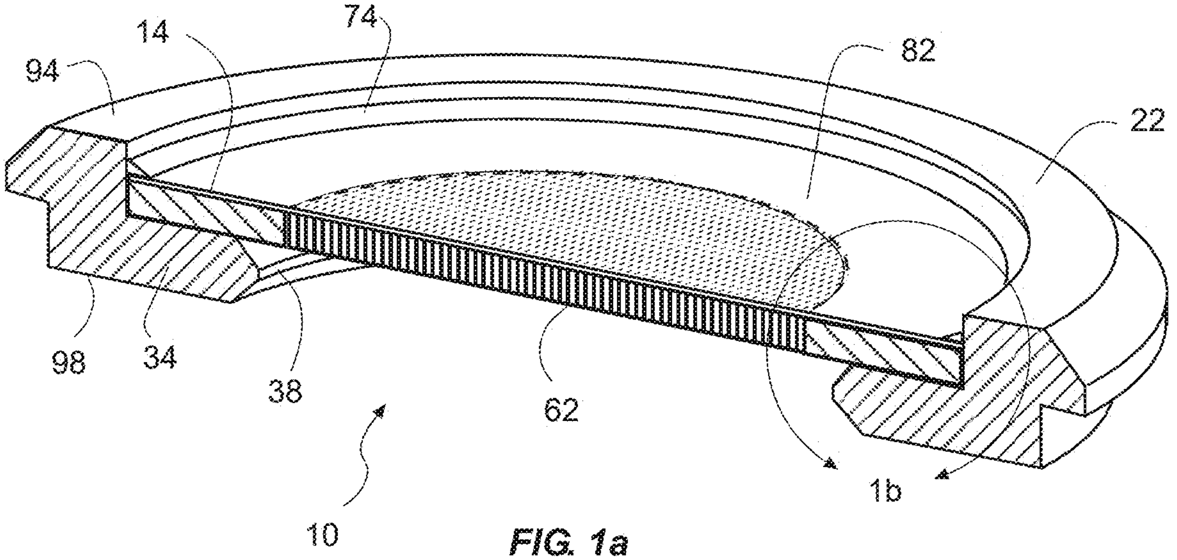
FIG. 1*a* is a cross-sectional perspective view of an example of a mounted x-ray window with an x-ray window mounted to a housing and an additive passivation film (APF) associated with the x-ray window according to some embodiments.

The drawings may not be to scale in order to illustrate some details.

Definitions. The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact.

As used herein, the terms "same as" or "equals" mean exactly the same; the same within normal manufacturing tolerances; or almost exactly the same, such that any deviation from exactly the same would have negligible effect for ordinary use of the device.

As used herein, the term "nm" means nanometer(s).

As used here, the term "detector" means a device that is capable of detecting x-rays, including scanning electron microscopy (SEM) and transmission electron microscopy (TEM) detectors for microanalysis, X-ray fluorescence (XRF) detectors, and Energy Dispersive X-ray Spectrometry (EDS/EDX). The x-ray windows described herein may be used with detectors in application such as calorimetry, proportional counters, high speed particle accelerators; microanalysis; etc.

DETAILED DESCRIPTION

Useful characteristics of x-ray windows include low gas permeability, low outgassing, high strength, low visible and infrared light transmission, high x-ray flux, made of low atomic number materials, corrosion resistance, high reliability, chemical resistance, humidity resistance, wear resistant, and low-cost. Each x-ray window design is a balance between these characteristics.

An x-ray window can combine with a housing to enclose an internal vacuum or gas backfill. The internal vacuum can aid device performance. For example, an internal vacuum for an x-ray detector (a) minimizes gas attenuation of incoming x-rays and (b) allows easier cooling of the x-ray detector.

Permeation of a gas through the x-ray window can degrade the internal vacuum or gas backfill. Thus, low gas permeability is a desirable x-ray window characteristic.

Outgassing from x-ray window materials can degrade the internal vacuum or gas backfill of the device. Thus, selection of materials with low outgassing is useful.

The x-ray window can face vacuum on one side and atmospheric pressure on an opposite side. Therefore, the x-ray window may need strength to withstand this differential pressure.

Visible and infrared light can cause undesirable noise in the x-ray detector. The ability to block transmission of visible and infrared light is another useful characteristic of x-ray windows.

A high x-ray flux through the x-ray window allows rapid functioning of the x-ray detector. Therefore, high x-ray transmissivity through the x-ray window is useful.

Detection and analysis of low-energy x-rays is needed in some applications. High transmission of low-energy x-rays is thus another useful characteristic of x-ray windows.

X-rays can be used to analyze a sample. X-ray noise from surrounding devices, including from the x-ray window, can interfere with a signal from the sample. X-ray noise from high atomic number materials are more problematic. It is helpful, therefore, for the x-ray window to be made of low atomic number materials.

X-ray windows can be used in corrosive environments, and may be exposed to corrosive chemicals during manufacturing. Thus, corrosion resistance is another useful characteristic of an x-ray window.

X-ray window failure is intolerable in many applications. For example, x-ray windows are used in analysis equipment on Mars. High reliability is a useful x-ray window characteristic.

X-ray window customers demand low-cost x-ray windows with the above characteristics. Reducing x-ray window cost is another consideration.

The x-ray windows described herein, and x-ray windows manufactured by the methods described herein, can have these useful characteristics (low gas permeability, low outgassing, high strength, low visible and infrared light transmission, high x-ray flux, low atomic number materials, corrosion resistance, high reliability, and low-cost). Each example may satisfy one, some, or all of these useful characteristics.

The technology described herein can provide an additive passivation film (APF) for an x-ray window. The APF may be applied to the x-ray window using atomic layer deposition (ALD). The x-ray window can comprise one or more layers. For example, the x-ray window can comprise a single layer of polyimide. As another example, the x-ray window can comprise a stack of layers, such as polyimide and aluminum, or polyimide, boron, and aluminum. The APF can be used in combination with the stack, such as on or in the stack. The layers in the stack can have thicknesses of 20 nanometers (nm) to 12 micrometers (μm) (12,000 nm). The APF can have a thickness less than the individual layers in the stack, such as less than 15 nm in one aspect, less than or equal to 8 nm in another aspect, and less than or equal to 5 nm in another aspect.

The stack of layers of the x-ray window can comprise different materials and different thicknesses to accomplish certain characteristics. For example, a layer can provide flexibility, strength, and/or support for the other layers, and can comprise polyimide in a thickness of 3000 angstroms or 300 nm. Another layer can provide a hermetic seal and/or diffusion resistance, and can comprise boron in a thickness of 20 nm. Another layer can provide light blocking, conductivity, and/or charge dissipation and can comprise aluminum. The layers can comprise low-Z materials, or low element materials with a low atomic number (Z) of protons in the nucleus, such as less than 14. In one aspect, one or more layers may have microcracks. The APF can seal cracks, resist humidity, strengthen a proximate layer, and/or be smoother to resist stress concentration surface discontinuities. The APF can be uniform and conformal to a proximate layer or the layer upon which it is applied. The APF can be deposited by ADL a monolayer at a time. The APF can be non-natural and non-self-limiting, as opposed to a natural oxide. In addition, the APF can have thickness greater than a natural oxide. The APF can provide a corrosion resistant protection barrier and/or can improve hermeticity of the window.

In another aspect, the window can comprise a support structure, such as a grid with ribs, to support the window or the stack of layers. The grid and ribs can comprise silicon, carbon, carbon fiber, stainless steel or other materials. In another aspect, the APF can overlap an interface between the ribs and the window or layers.

The APF can be applied to the x-ray window before or after mounting to a housing. The APF can extend beyond the x-ray layer and can overlap a seam between the x-ray window and the housing. This helps seal the seam and results in a more effective hermetic seal. In another aspect, APF can coat some or all of the housing.

The application or deposition of the APF can include an elevated temperature that can outgas moisture from the polyimide layer, which can be absorptive and which can retain moisture, before the polyimide layer is sealed by the APF or another layer.

Figure 1B:
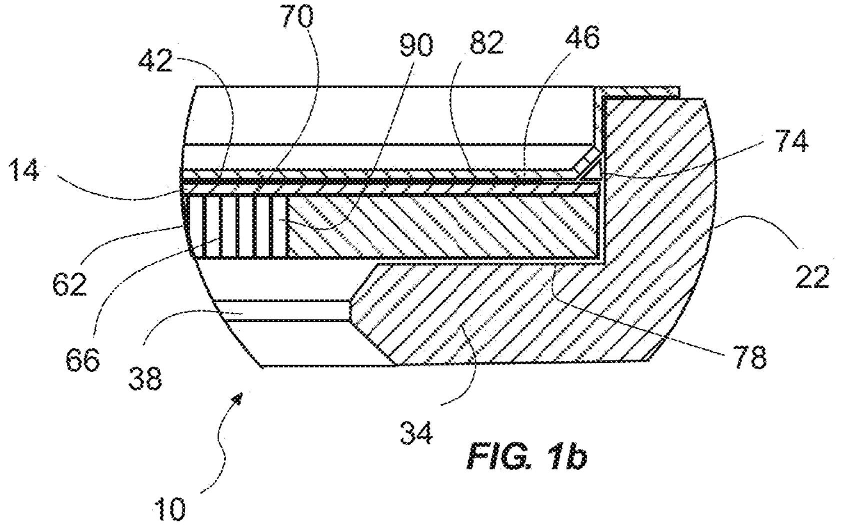
FIG. 1*b* is a detailed, partial, cross-sectional side view of the mounted x-ray window of FIG. 1*a*, taken along line 1*b*.
Figure 2:
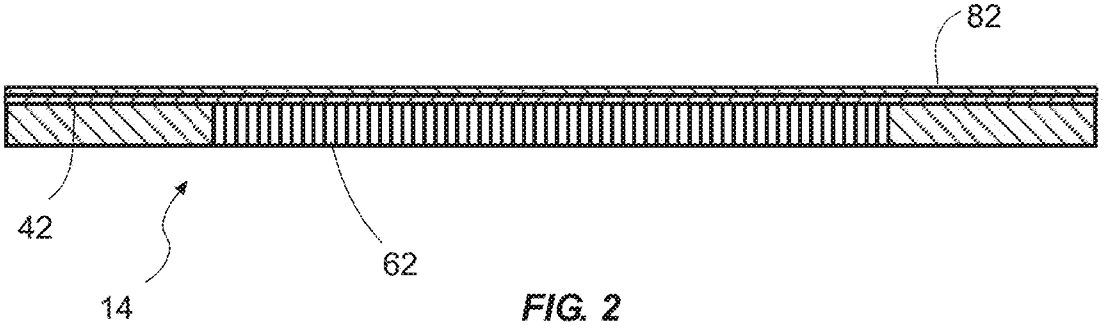
FIG. 2 is a cross-sectional side view of an example x-ray window with an additive passivation film according to some embodiments.

Referring to FIGS. 1*a*, 1*b* and 2, an example mounted x-ray window 10 is shown according to some embodiments with an x-ray window 14 mounted on a housing 22 or mount. The x-ray window 14 can be a light element detection x-ray window for used in microanalysis applications and capable of high transmission of low-energy x-rays in high vacuum with differential pressure. The mounted x-ray window 10 may be part of a detector chamber containing a detector and subject to a vacuum or pressure differential, similar to a detector chamber 26 and detector 30 shown in FIG. 8.

The housing 22 can have a flange 34 encircling an aperture 38. The housing 22 can be made of metal, such as stainless steel, and can be formed by machining.

Figure 3:
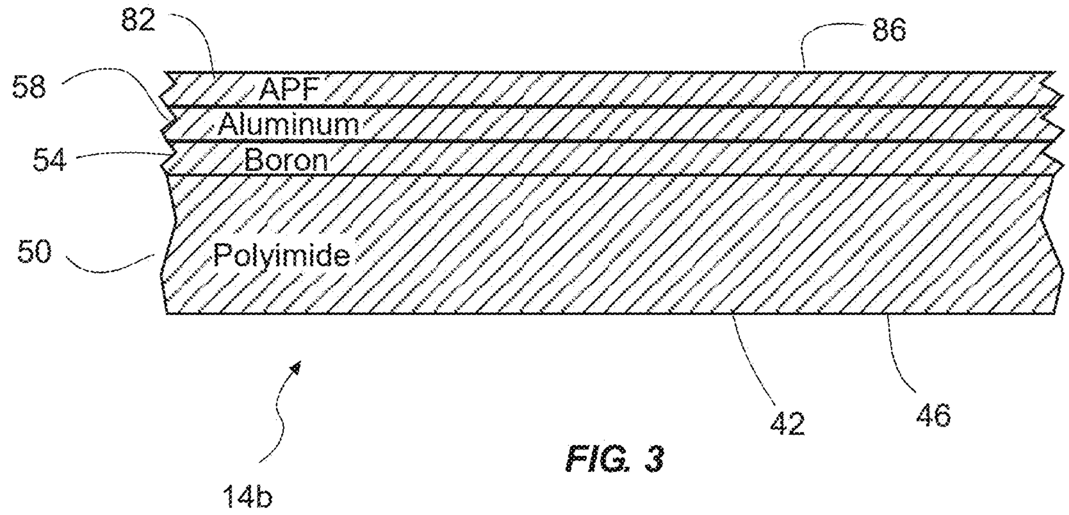
FIG. 3 is a partial cross-sectional side view of an example x-ray window with a stack of layers and an additive passivation film on an exterior surface according to some embodiments.

The x-ray window 14 can be mounted on the flange 34 and can span and cover the aperture 38. In one aspect, the x-ray window 14 can include one or more layers 42. Referring to FIG. 3, in another aspect, the x-ray window 14 can include a plurality of layers 42 in a stack 46 of layers 42 mounted on the flange 34 and spanning and covering the aperture 38. Each layer 42 can have a low atomic number less than 14. The plurality of layers 42 can comprise: 1) a relatively flexible support layer 50, such as a polyimide layer, configured to provide support for others of the plurality of layers; 2) a relatively rigid seal layer 54, such as a boron layer, configured to provide a substantial hermetic seal; and a light blocking or charge dissipation layer 58, such as an aluminum layer, configured to substantially block light, or dissipate charge, or both. A surface of one or more of the layers 42 and/or a surface of the stack 46 may comprise surface micro-cracks.

Referring again to FIGS. 1*a*, 1*b* and 2, the x-ray window 14 and the plurality of layers 42 can further comprise a support grid 62 that can support the one or more layers 42 on the support grid 62. The support grid 62 can comprise ribs 66 spanning the aperture 38. An interface 70 can be formed between the ribs 66 of the support grid 62 and the one or more layers 42 of the x-ray window 14.

A seam 74 can be formed between a perimeter edge of the x-ray window 14 and the flange 34 of the housing 22. An adhesive 78 can be in the seam 74 and can adhere the x-ray window 14 to the flange 34.

An additive passivation film (APF) 82 can be associated with the x-ray window 14 and the stack 46 of layers. The APF 82 can have a thickness greater than 5 nanometers (nm) and less than a thickness of each of the layers 42 of x-ray window 14 and the stack 46. In addition, the APF 82 can comprise a material different than each of the layers 42 of the x-ray window 14 and the stack 46. In one aspect, the APF 82 can include at least one material selected from aluminum oxide ($Al_2O_3$), boron nitride (BN), boron trioxide ($B_2O_3$), silicon dioxide ($SiO_2$), aluminum nitride (AlN), silicon nitride ($Si_3N_4$), aluminum fluoride ($AlF_3$), boron carbide ($B_4C$), and boron oxide ($B_2O_3$, BO, or $B_6O$). These chemicals can also be nonstoichiometric combinations of these elements.

Aluminum oxide is preferred due to easy deposition, uniformity, and a hermetic seal with a thin layer. Furthermore, aluminum oxide is preferred for corrosion protection:

1. Moxtek's AP3 x-ray windows, without an APF, survived at 60 °C and 80% relative humidity for 3.5 days.
2. Moxtek's AP3 x-ray windows, with an aluminum oxide APF, survived at 60 °C and 80% relative humidity for 15.7 days.

Aluminum oxide also improves x-ray window plasma resistance. In some applications, x-ray windows are exposed to plasma, so plasma resistance is useful.

In another aspect, the APF 82 can fill any surface micro-cracks in the layers 42 for the x-ray window 14 and the stack 46.

Referring to FIG. 3, an example x-ray window 14*b* is shown according to some embodiments. As described herein, the x-ray window 14*b* can comprise a plurality of layers 42 in a stack 46 of layers. The layers 42 can comprise an inner polyimide layer 50, an intermediate boron layer 54, an intermediate aluminum layer 58, and an outer APF 82. Thus, the APF 82 can be an outermost layer 86 with respect to the plurality of layers 42, which can provide the x-ray window 14*b* with protection from plasma.

The APF 82 can be added to a surface of one or more of the layers 42, such as aluminum layer 58. In addition, the APF 82 can have an exposed surface. The terms "inner" and "outer" can be with respect to a detector 30 (FIG. 8) in an interior 26 (FIG. 8) of the housing 22 and a vacuum or low pressure inside the housing 22. The polyimide layer 50 can have a thickness of approximately 300 nm. The boron layer 54 can have a thickness of approximately 20 nm. The aluminum layer 58 can have a thickness of approximately 20 nm. The APF 82 can have a thickness of approximately 8 nm.

Figure 4:
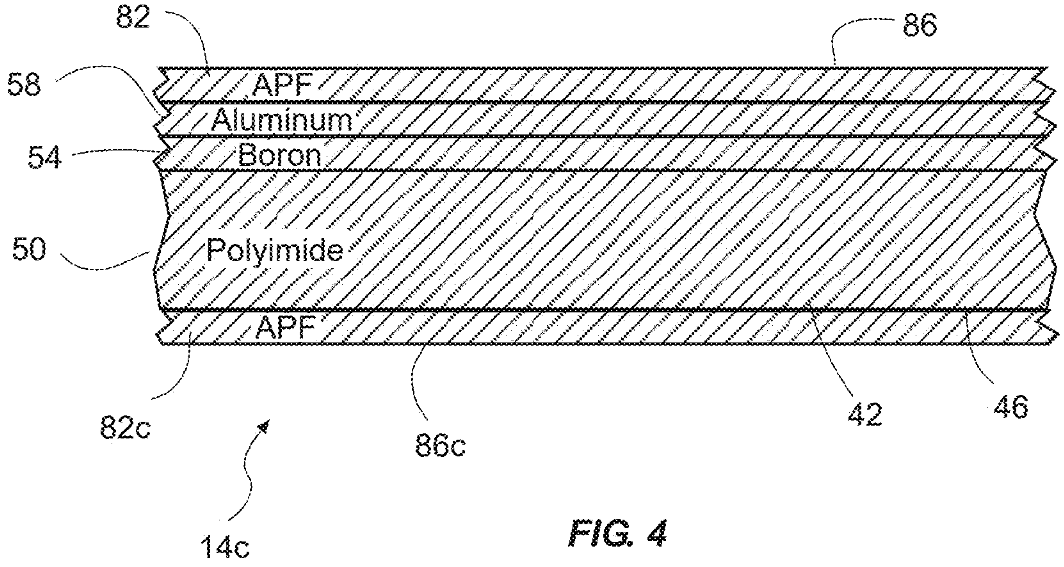
FIG. 4 is a partial cross-sectional side view of an example x-ray window with a stack of layers and additive passivation films on an exterior surface and an interior surface according to some embodiments.

Referring to FIG. 4, an example x-ray window 14*c* is shown according to some embodiments. The layers 42 can comprise an inner APF 82*c*, an intermediate polyimide layer 50, an intermediate boron layer 54, an intermediate aluminum layer 58, and an outer APF layer 82. Thus, the x-ray window 14*c* can have a pair APFs 82 and 82*c* on opposite sides of the x-ray window 14*c* and sandwiching the other layers 42 and the stack 46. Use of a pair APFs 82 and 82*c* helps balance stress, and thus results in a more robust x-ray widow.

In addition, both APFs 82 and 82*c* can have exposed surfaces 86 and 86*c* with one surface 86 exposed to ambient conditions and the other surface 86*c* exposed to the vacuum or lower pressure. The APFs 82 and 86*c* can be added to the surfaces of the aluminum layer 58 and the polyimide layer 50.

Figure 5:
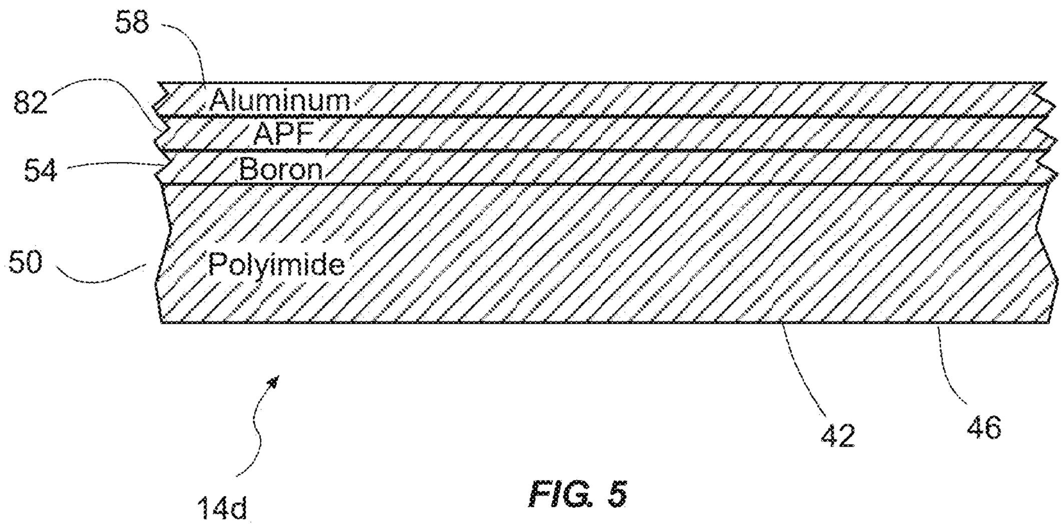
FIG. 5 is a partial cross-sectional side view of an example x-ray window with a stack of layers and an additive passivation film on one of the layers and sandwiched between two of the layers according to some embodiments.

Referring to FIG. 5, an example x-ray window 14*d* is shown according to some embodiments. The layers 42 can comprise an inner an inner polyimide layer 50, an intermediate boron layer 54, an intermediate APF 82, and an outer aluminum layer 58. Thus, the APF 82 can be an inner or intermediate layer sandwiched between two of the plurality of layers 54 and 58. The APF 82 can be added to a surface of either the boron or the aluminum layers 54 and 58.

Figure 6:
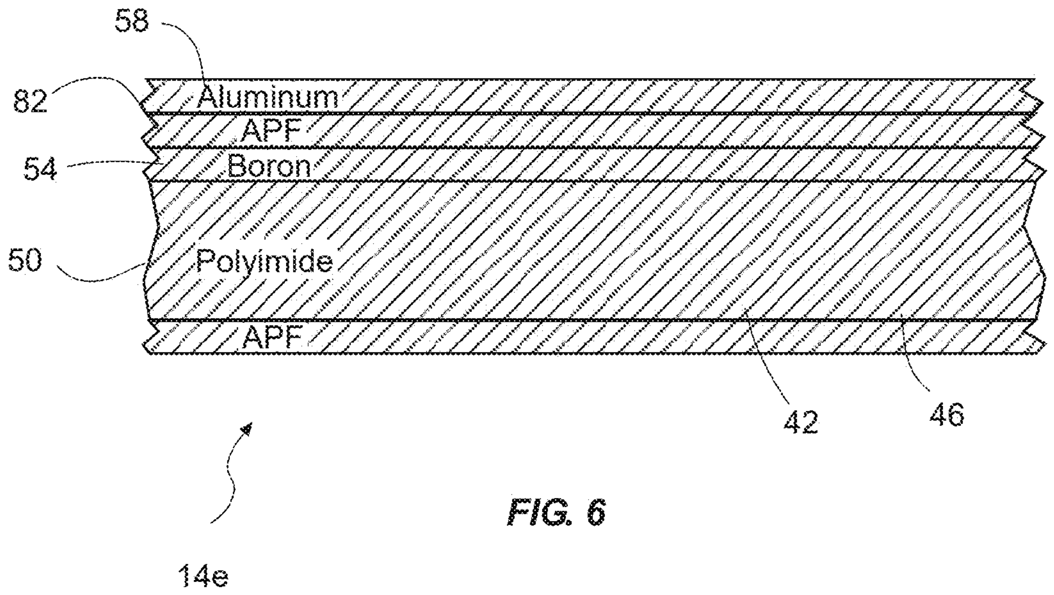
FIG. 6 is a partial cross-sectional side view of an example x-ray window with a stack of layers and an additive passivation film on an interior surface and another additive passivation film on one of the layers and sandwiched between two of the layers according to some embodiments.

Referring to FIG. 6, an example x-ray window 14*e* is shown according to some embodiments. The layers 42 can comprise an inner APF 82*c*, an intermediate polyimide layer 50, an intermediate boron layer 54, an intermediate APF layer 82, and an outer aluminum layer 58. Thus, the x-ray window 14*e* can have multiple APFs 82 and 82*c* including intermediate and end APFs.

Figure 7:
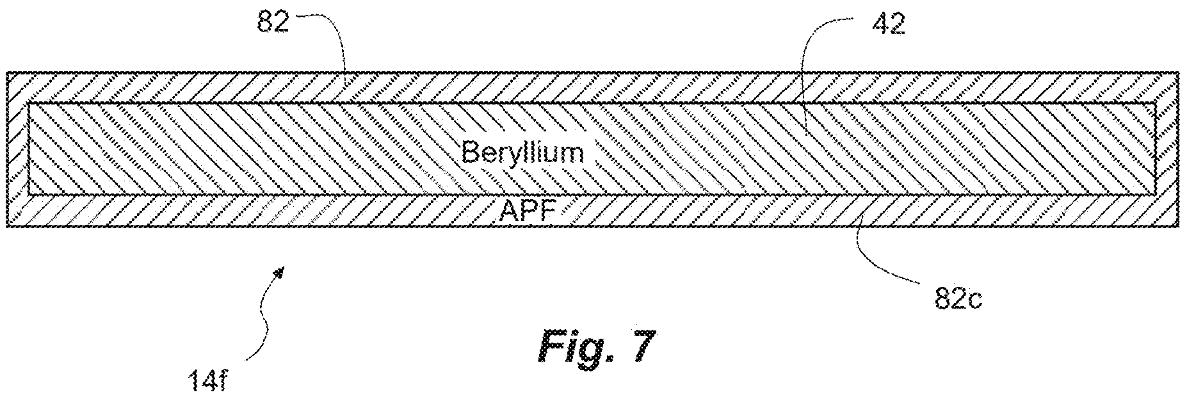
FIG. 7 is a cross-sectional side view of an example x-ray window with a single layer and additive passivation films on an exterior surface and an interior surface according to some embodiments.

Referring to FIG. 7, an example x-ray window 14*f* is shown according to some embodiments. The x-ray window 14*f* can have a single layer 42, such as beryllium, with a pair of APFs 82 and 82*c* sandwiching the single layer 42 therebetween. In one aspect, the APF 82 and 82*c* can surround the layer.

In one aspect, the APF 82 or APFs can be applied only to the x-ray window 14. In another aspect, the APF 82 can be applied to the x-ray window 42 and the housing 22.

Referring again to FIG. 1, the APF 82 can extend beyond the x-ray window 14 and can overlap the seam 74, as shown in FIG. 1*b*. In addition, the APF 82 can extend beyond the x-ray window 14 and can overlap the seam 74 and the housing 22.

Referring again to FIG. 2, the APF 82 can be disposed on the ribs 66 of the support grid 62. The APF 82 can extend into gaps 90 between the ribs 66. The APF 82 can overlap the interface 70 between the ribs 66 and the inner layer 42 of the x-ray window 14 and the stack 46.

Figure 8:
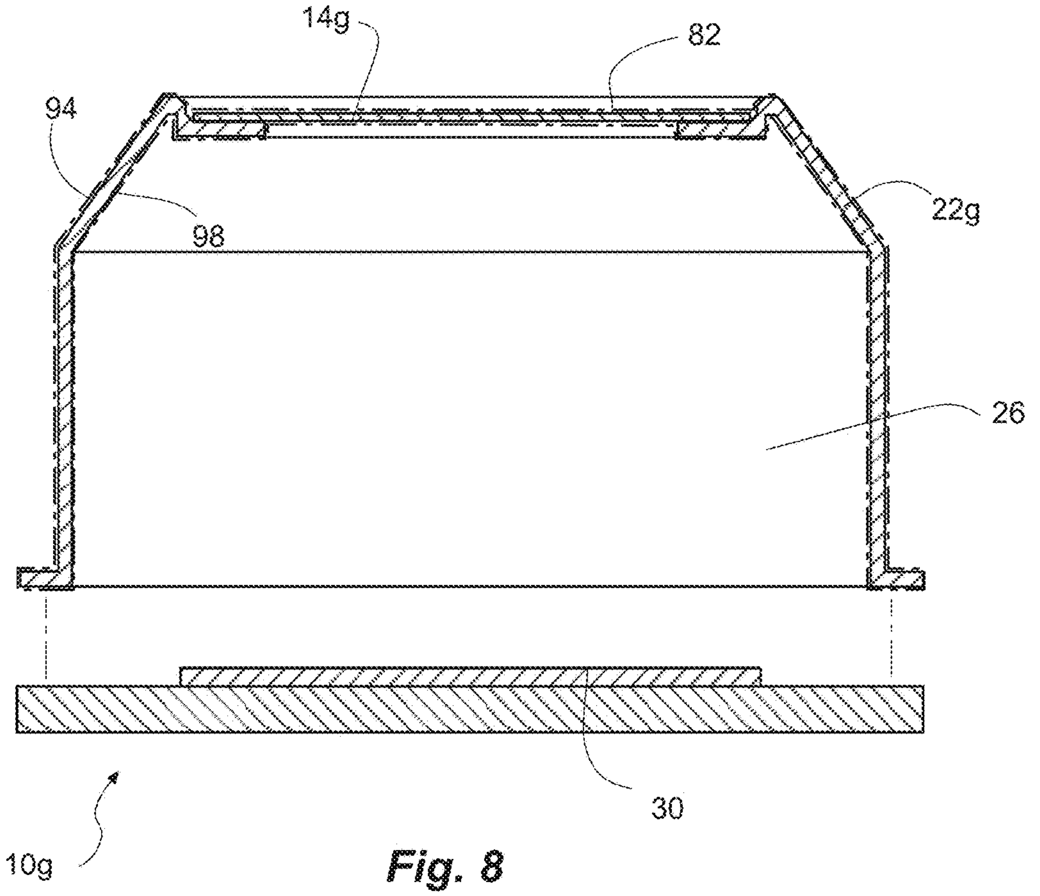
FIG. 8 is a cross-sectional side exploded view of an example of a mounted x-ray window with an x-ray window mounted to a housing and an additive passivation film associated with the x-ray window and overlapping a seam between the x-ray window and the housing, and overlapping the housing, according to some embodiments.

Referring to FIG. 8, an example mounted x-ray window 10*g* is shown according to some embodiments with an x-ray window 14*g* mounted on a housing 22*g* or mount. As described herein, the mounted x-ray window 10*g* may be part of a detector chamber 26 containing a detector 30 and subject to a vacuum or pressure differential. An APF 82 can extend beyond the x-ray window 10*g* and can coat some of all of the housing 22*g*, as shown by phantom lines. In one aspect, the APF 82 can cover an exterior surface 94 of the housing 22*g*. In another aspect, the APF 82 can cover an interior surface 98 of the housing 22*g*.

In another aspect, the APF 82 can cover both the exterior surface 94 and the interior surface 98 of the housing 22*g*. Thus, the APF 82 seals cracks on both the exterior surface 94 and the interior surface 98, reducing gas permeation and reducing the gas leak rate.

In one aspect, the APF(s) 82 can be applied to the one or more layers by atomic layer deposition (ALD). ALD is preferred for forming a conformal layer, that conforms to the contours of feature topology, resulting in an improved hermetic seal, and adequate coverage with minimal amount of material. Due to the ability of ALD to form a conformal layer, it can effectively seal cracks. ALD is also preferred because it can deposit a monolayer of material, which is useful if a very thin APF layer is required.

In another aspect, the APF(s) 82 can be an atomic layer deposition (ALD) film(s). The APF(s) and/or the ALD film can be a protective barrier against plasma, such as from plasma cleaning.

METHOD

A method of making a mounted x-ray window 14 can include some or all of the following steps:

Obtaining a layer 42 of material with a low atomic number less than 14.

Applying an additive passivation film (APF) 82 to the layer 42 by atomic layer deposition (ALD) to a thickness greater than 5 nanometers (nm) and less than a thickness of the layer(s) 42. The APF 82 can comprise a material different than the layer 42.

Bonding the layer 42 to a flange 34 of a housing 22 having an aperture 38 with the layer 42 spanning and covering the aperture 38.

In one aspect, the method can include combining a plurality of layers 42 together in a stack 46, each layer 42 having a low atomic number less than 14. The method can comprise supporting the layer 42 with a support grid 62 with ribs 66 spanning the aperture 38 and an interface 70 formed between the ribs 66 and the layer 42.

In another aspect, the ALD can comprise applying a temperature to the layer(s) 42 less than 400 degrees Celsius. Deposition at a lower temperature allows use of temperature-sensitive materials in the x-ray window. The APF 80 can be applied to an exterior of the stack 46. The APF 82 can be applied to one of the plurality of layers 42 and the APF 82 can be sandwiched between two of the plurality of layers 42. The APF 82 can be applied to the ribs 66 and overlapping the interface 70 between the ribs 66 and the layer 42. The APF 82 can be applied to a seam 74 between a perimeter edge of the x-ray window 14 and the flange 34 of the housing 22. The APF 82 can fill surface micro-cracks in a surface of the one or more layers 42. The APF 82 can be applied to an exterior surface 94 of the housing 22. The APF 82 can be applied to an interior surface 98 of the housing 22. The APF 82 can be applied to both an exterior surface 94 and an interior surface 98 of the housing 22.

What is claimed is:

1. A mounted x-ray window comprising:
- a housing including a flange encircling an aperture;
- an x-ray window mounted on the flange and spanning and covering the aperture;
- the x-ray window including one or more layers each having an atomic number less than 14; and
- an additive passivation film associated with the x-ray window, the additive passivation film having a thickness greater than 5 nanometers (nm) and less than a thickness of each of the one or more layers, and comprising a material different than the one or more layers.

2. The mounted x-ray window of claim 1, wherein the additive passivation film includes at least one material selected from aluminum oxide, boron nitride, boron trioxide, silicon dioxide, aluminum nitride, silicon nitride, aluminum fluoride, boron carbide, and boron oxide.

3. The mounted x-ray window of claim 1, wherein the additive passivation film includes aluminum oxide.

4. The mounted x-ray window of claim 1, wherein the additive passivation film is an atomic layer deposition (ALD) film.

5. The mounted x-ray window of claim 1, wherein a surface of the one or more layers comprises surface micro-cracks; and wherein the additive passivation film fills the surface micro-cracks.

6. The mounted x-ray window of claim 1, further comprising:
- a seam between a perimeter edge of the x-ray window and the flange of the housing;
- an adhesive in the seam and adhering the x-ray window to the flange; and
- the additive passivation film extending beyond the x-ray window and overlapping the seam.

7. The mounted x-ray window of claim 6, wherein the additive passivation film covers an exterior surface of the housing.

8. The mounted x-ray window of claim 6, wherein the additive passivation film covers an interior surface of the housing.

9. The mounted x-ray window of claim 6, wherein the additive passivation film covers both an exterior surface and an interior surface of the housing.

10. The mounted x-ray window of claim 1, further comprising:
- the additive passivation film extending beyond the x-ray window and overlapping the housing.

11. The mounted x-ray window of claim 1, wherein:
- the one or more layers comprises a plurality of layers; and
- the additive passivation film is an outermost layer with respect to the plurality of layers and has an exposed surface.

12. The mounted x-ray window of claim 1, wherein:
- the one or more layers comprises a plurality of layers; and
- the additive passivation film is an inner layer sandwiched between two of the plurality of layers.

13. The mounted x-ray window of claim 1, further comprising:
- a support grid with the one or more layers on the support grid, the support grid comprising ribs spanning the aperture;
- an interface formed between the ribs and the one or more layers on the support grid; and
- the additive passivation film disposed on the ribs and overlapping the interface between the ribs and the one or more layers.

14. The mounted x-ray window of claim 1, wherein the additive passivation film is added to a surface of the one or more layers.

15. A mounted x-ray window comprising:
- a housing including a flange encircling an aperture;
- a stack of layers mounted on the flange and spanning and covering the aperture;
- the stack of layers comprising a plurality of layers each having a low atomic number less than 14;
- an additive passivation film having a thickness greater than 5 nanometers (nm) and less than a thickness of each of the plurality of layers, and comprising a material different than the plurality of layers; and
- the additive passivation film includes at least one material selected from aluminum oxide, boron nitride, boron trioxide, silicon dioxide, aluminum nitride, silicon nitride, aluminum fluoride, boron carbide, and boron oxide.

16. The mounted x-ray window of claim 15, wherein the additive passivation film is an atomic layer deposition (ALD) film.

17. The mounted x-ray window of claim 15, further comprising:
- a seam between a perimeter edge of the x-ray window and the flange of the housing;
- an adhesive in the seam and adhering the x-ray window to the flange; and
- the additive passivation film extending beyond the x-ray window and overlapping the seam.

18. The mounted x-ray window of claim 15, further comprising:
- the additive passivation film extending beyond the x-ray window and overlapping the housing.

19. The mounted x-ray window of claim 15, further comprising:
- a support grid with the stack of layers on the support grid, the support grid comprising ribs spanning the aperture;
- an interface formed between the ribs and the one or more layers on the support grid; and
- the additive passivation film disposed on the ribs and overlapping the interface between the ribs and the one or more layers.

20. A mounted x-ray window comprising:
- a housing including a flange encircling an aperture;
- an x-ray window mounted on the flange and spanning and covering the aperture;
- the x-ray window including one or more layers each having a low atomic number less than 14;
- an additive passivation film having a thickness greater than 5 nanometers (nm) and less than a thickness of each of the one or more layers, and comprising a material different than the one or more layers; and
- the additive passivation film extending beyond the x-ray window and overlapping the housing.

* * * * *